United States Patent
Wang et al.

(10) Patent No.: US 8,824,596 B1
(45) Date of Patent: Sep. 2, 2014

(54) SYSTEM AND METHOD FOR UPLINK TRANSMISSIONS IN TIME DIVISION MIMO RDN ARCHITECTURE

(71) Applicant: Magnolia Broadband Inc., Englewood, NJ (US)

(72) Inventors: Sherwin J. Wang, Towaco, NJ (US); Phil F. Chen, Denville, NJ (US); Haim Harel, New York, NY (US); Eduardo Abreu, Allentown, PA (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

(21) Appl. No.: 13/955,194

(22) Filed: Jul. 31, 2013

(51) Int. Cl.
*H04B 7/06* (2006.01)

(52) U.S. Cl.
USPC .......................................... 375/299; 375/267

(58) Field of Classification Search
CPC ...... H04B 7/04; H04B 7/0404; H04B 7/0408; H04B 7/0413; H04B 7/0671; H04B 7/0697
USPC ................................................. 375/299, 267
See application file for complete search history.

(56) References Cited

U.S. PATENT DOCUMENTS

| | | | |
|---|---|---|---|
| 4,044,359 A | 8/1977 | Applebaum et al. | |
| 4,079,318 A | 3/1978 | Kinoshita | |
| 4,359,738 A | 11/1982 | Lewis | |
| 4,540,985 A | 9/1985 | Clancy et al. | |
| 4,628,320 A | 12/1986 | Downie | |
| 5,162,805 A | 11/1992 | Cantrell | |
| 5,363,104 A | 11/1994 | Richmond | |
| 5,444,762 A | 8/1995 | Frey et al. | |
| 5,732,075 A | 3/1998 | Tangemann et al. | |
| 5,915,215 A | 6/1999 | Williams et al. | |
| 5,940,033 A | 8/1999 | Locher et al. | |

(Continued)

FOREIGN PATENT DOCUMENTS

| EP | 1 867 177 | 5/2010 |
|---|---|---|
| EP | 2 234 355 | 9/2010 |

(Continued)

OTHER PUBLICATIONS

KozŁowski, et al., "Phased Array Antennas in MIMO Receiver", Journal of Telecommunications and Information Technology, Jan. 2007, pp. 26-29.

(Continued)

*Primary Examiner* — Kevin Kim
(74) *Attorney, Agent, or Firm* — Pearl Cohen Zedek Latzer Baratz LLP (57) ABSTRACT

A mobile device in a (e.g., full rank N×N) MIMO system is augmented by a plurality of kn antennae coupled to at least one of N beamformers such that the total number of antennae $M=\Sigma_{n=1}^{n=N}$ is greater than the total number of beamformers N. A highest gain anchor (e.g., optimal) antenna set may be selected from among a plurality of antenna sets, each antenna set comprising a different one of the kn antennae for each nth beamformer. The phase(s) of the non-selected kn−1 antennae may be set to align with the phase of the selected anchor antenna for each nth beamformer. Using TDD communication, the highest gain anchor antenna set for transmitting during the uplink periods may be determined using information measured by at least some of the plurality of M antennae while receiving during one or more downlink periods.

27 Claims, 3 Drawing Sheets

(56) References Cited

U.S. PATENT DOCUMENTS

| | | |
|---|---|---|
| 6,018,317 A | 1/2000 | Dogan et al. |
| 6,046,655 A | 4/2000 | Cipolla |
| 6,101,399 A | 8/2000 | Raleigh et al. |
| 6,215,812 B1 | 4/2001 | Young et al. |
| 6,226,507 B1 | 5/2001 | Ramesh et al. |
| 6,230,123 B1 | 5/2001 | Mekuria et al. |
| 6,297,772 B1 | 10/2001 | Lewis |
| 6,321,077 B1 | 11/2001 | Saitoh et al. |
| 6,377,783 B1 | 4/2002 | Lo et al. |
| 6,584,115 B1 | 6/2003 | Suzuki |
| 6,697,633 B1 | 2/2004 | Dogan et al. |
| 6,927,646 B2 | 8/2005 | Niemi |
| 6,975,582 B1 | 12/2005 | Karabinis et al. |
| 6,987,958 B1 | 1/2006 | Lo et al. |
| 7,068,628 B2 | 6/2006 | Li et al. |
| 7,177,663 B2 | 2/2007 | Axness et al. |
| 7,257,425 B2 | 8/2007 | Wang et al. |
| 7,299,072 B2 | 11/2007 | Ninomiya |
| 7,499,109 B2 | 3/2009 | Kim et al. |
| 7,606,528 B2 | 10/2009 | Mesecher |
| 7,742,000 B2 | 6/2010 | Mohamadi |
| 7,769,107 B2 | 8/2010 | Sandhu et al. |
| 7,898,478 B2 | 3/2011 | Niu et al. |
| 7,970,366 B2 | 6/2011 | Arita et al. |
| 8,078,109 B1 | 12/2011 | Mulcay |
| 8,115,679 B2 | 2/2012 | Falk |
| 8,155,613 B2 | 4/2012 | Kent et al. |
| 8,280,443 B2 | 10/2012 | Tao et al. |
| 8,294,625 B2 | 10/2012 | Kittinger et al. |
| 8,306,012 B2 | 11/2012 | Lindoff et al. |
| 8,315,671 B2 | 11/2012 | Kuwahara et al. |
| 8,369,436 B2 | 2/2013 | Stirling-Gallacher |
| 8,509,190 B2 | 8/2013 | Rofougaran |
| 8,520,657 B2 | 8/2013 | Rofougaran |
| 8,526,886 B2 | 9/2013 | Wu et al. |
| 8,599,955 B1 | 12/2013 | Kludt et al. |
| 8,599,979 B2 | 12/2013 | Farag et al. |
| 8,649,458 B2 | 2/2014 | Kludt et al. |
| 2001/0029326 A1 | 10/2001 | Diab et al. |
| 2001/0038665 A1 | 11/2001 | Baltersee et al. |
| 2002/0051430 A1 | 5/2002 | Kasami et al. |
| 2002/0065107 A1 | 5/2002 | Harel et al. |
| 2002/0085643 A1 | 7/2002 | Kitchener et al. |
| 2002/0107013 A1 | 8/2002 | Fitzgerald |
| 2002/0115474 A1 | 8/2002 | Yoshino et al. |
| 2003/0114162 A1 | 6/2003 | Chheda et al. |
| 2003/0153322 A1 | 8/2003 | Burke et al. |
| 2003/0203717 A1 | 10/2003 | Chuprun et al. |
| 2004/0056795 A1 | 3/2004 | Ericson et al. |
| 2004/0121810 A1 | 6/2004 | Goransson et al. |
| 2004/0125899 A1 | 7/2004 | Li et al. |
| 2004/0125900 A1 | 7/2004 | Liu et al. |
| 2004/0166902 A1 | 8/2004 | Castellano et al. |
| 2004/0228388 A1 | 11/2004 | Salmenkaita |
| 2004/0235527 A1 | 11/2004 | Reudink et al. |
| 2005/0068230 A1 | 3/2005 | Munoz et al. |
| 2005/0068918 A1 | 3/2005 | Mantravadi et al. |
| 2005/0075140 A1 | 4/2005 | Famolari |
| 2005/0129155 A1 | 6/2005 | Hoshino |
| 2005/0147023 A1 | 7/2005 | Stephens et al. |
| 2005/0245224 A1 | 11/2005 | Kurioka |
| 2005/0250544 A1 | 11/2005 | Grant et al. |
| 2005/0287962 A1 | 12/2005 | Mehta et al. |
| 2006/0041676 A1 | 2/2006 | Sherman |
| 2006/0094372 A1 | 5/2006 | Ahn et al. |
| 2006/0135097 A1 | 6/2006 | Wang et al. |
| 2006/0227854 A1 | 10/2006 | McCloud et al. |
| 2006/0264184 A1 | 11/2006 | Li et al. |
| 2006/0270343 A1 | 11/2006 | Cha et al. |
| 2006/0271969 A1 | 11/2006 | Takizawa et al. |
| 2006/0285507 A1 | 12/2006 | Kinder et al. |
| 2007/0076675 A1 | 4/2007 | Chen |
| 2007/0093261 A1 | 4/2007 | Hou et al. |
| 2007/0223380 A1 | 9/2007 | Gilbert et al. |
| 2008/0043867 A1 | 2/2008 | Blanz et al. |
| 2008/0051037 A1 | 2/2008 | Molnar et al. |
| 2008/0144737 A1 | 6/2008 | Naguib |
| 2008/0165732 A1 | 7/2008 | Kim et al. |
| 2008/0238808 A1 | 10/2008 | Arita et al. |
| 2008/0280571 A1 | 11/2008 | Rofougaran et al. |
| 2009/0028225 A1 | 1/2009 | Runyon et al. |
| 2009/0046638 A1 | 2/2009 | Rappaport et al. |
| 2009/0058724 A1 | 3/2009 | Xia et al. |
| 2009/0121935 A1 | 5/2009 | Xia et al. |
| 2009/0154419 A1 | 6/2009 | Yoshida et al. |
| 2009/0190541 A1 | 7/2009 | Abedi |
| 2009/0268616 A1 | 10/2009 | Hosomi |
| 2009/0322610 A1 | 12/2009 | Hants et al. |
| 2009/0322613 A1 | 12/2009 | Bala et al. |
| 2010/0002656 A1 | 1/2010 | Ji et al. |
| 2010/0037111 A1 | 2/2010 | Ziaja et al. |
| 2010/0040369 A1 | 2/2010 | Zhao et al. |
| 2010/0117890 A1 | 5/2010 | Vook et al. |
| 2010/0135420 A1 | 6/2010 | Xu et al. |
| 2010/0172429 A1 | 7/2010 | Nagahama et al. |
| 2010/0195560 A1 | 8/2010 | Nozaki et al. |
| 2010/0234071 A1 | 9/2010 | Shabtay et al. |
| 2010/0283692 A1 | 11/2010 | Achour et al. |
| 2010/0285752 A1 | 11/2010 | Lakshmanan et al. |
| 2010/0303170 A1 | 12/2010 | Zhu et al. |
| 2010/0316043 A1 | 12/2010 | Doi et al. |
| 2011/0019639 A1 | 1/2011 | Karaoguz et al. |
| 2011/0032849 A1 | 2/2011 | Yeung et al. |
| 2011/0032972 A1 | 2/2011 | Wang et al. |
| 2011/0105036 A1 | 5/2011 | Rao et al. |
| 2011/0150050 A1 | 6/2011 | Trigui et al. |
| 2011/0150066 A1 | 6/2011 | Fujimoto |
| 2011/0163913 A1 | 7/2011 | Cohen et al. |
| 2011/0205883 A1* | 8/2011 | Mihota ........................ 370/203 |
| 2011/0228742 A1 | 9/2011 | Honkasalo et al. |
| 2011/0249576 A1 | 10/2011 | Chrisikos et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2012/0014377 A1 | 1/2012 | Joergensen et al. |
| 2012/0015603 A1 | 1/2012 | Proctor et al. |
| 2012/0020396 A1 | 1/2012 | Hohne et al. |
| 2012/0033761 A1 | 2/2012 | Guo et al. |
| 2012/0034952 A1 | 2/2012 | Lo et al. |
| 2012/0045003 A1 | 2/2012 | Li et al. |
| 2012/0064838 A1 | 3/2012 | Miao et al. |
| 2012/0076028 A1 | 3/2012 | Ko et al. |
| 2012/0170672 A1 | 7/2012 | Sondur |
| 2012/0201153 A1 | 8/2012 | Bharadia et al. |
| 2012/0201173 A1 | 8/2012 | Jain et al. |
| 2012/0207256 A1 | 8/2012 | Farag et al. |
| 2012/0212372 A1 | 8/2012 | Petersson et al. |
| 2012/0218962 A1 | 8/2012 | Kishiyama et al. |
| 2012/0230380 A1 | 9/2012 | Keusgen et al. |
| 2012/0251031 A1 | 10/2012 | Suarez et al. |
| 2012/0270544 A1 | 10/2012 | Shah |
| 2012/0314570 A1 | 12/2012 | Forenza et al. |
| 2013/0010623 A1 | 1/2013 | Golitschek |
| 2013/0023225 A1 | 1/2013 | Weber |
| 2013/0051283 A1 | 2/2013 | Lee et al. |
| 2013/0070741 A1 | 3/2013 | Li et al. |
| 2013/0079048 A1 | 3/2013 | Cai et al. |
| 2013/0094621 A1 | 4/2013 | Luo et al. |
| 2013/0101073 A1 | 4/2013 | Zai et al. |
| 2013/0156120 A1 | 6/2013 | Josiam et al. |
| 2013/0170388 A1 | 7/2013 | Ito et al. |
| 2013/0208619 A1 | 8/2013 | Kudo et al. |
| 2013/0223400 A1 | 8/2013 | Seo et al. |
| 2013/0242976 A1 | 9/2013 | Katayama et al. |
| 2013/0272437 A1 | 10/2013 | Eidson et al. |
| 2013/0331136 A1 | 12/2013 | Yang et al. |

FOREIGN PATENT DOCUMENTS

| | | |
|---|---|---|
| WO | WO 03/047033 | 6/2003 |
| WO | WO 03/073645 | 9/2003 |

(56) References Cited

FOREIGN PATENT DOCUMENTS

| WO | WO 2010/085854 | 8/2010 |
|---|---|---|
| WO | WO 2011/060058 | 5/2011 |

OTHER PUBLICATIONS

Office Action issued by the United States Patent and Trademark Office for U.S. Appl. No. 13/630,146 dated Jan. 22, 2013.
Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 14/172,500, dated Mar. 26, 2014.
Notice of Allowance issued by the United States Patent and Trademark Office for U.S. Appl. No. 14/065,182, dated Mar. 25, 2014.
Notice of Allowance issued by the United States Patent and Trademark Office for U.S. Appl. No. 14/068,863, dated Mar. 25, 2014.
Office Action issued by the United States Patent and Trademark Office for U.S. Appl. No. 14/010,771, dated Apr. 4, 2014.
Office Action issued by the United States Patent and Trademark Office for U.S. Appl. No. 14/085,352, dated Apr. 7, 2014.
Office Action issued by the United States Patent and Trademark Office for U.S. Appl. No. 13/889,150, dated Apr. 9, 2014.
Office Action issued by the United States Patent and Trademark Office for U.S. Appl. No. 14/097,765, dated Apr. 22, 2014.
Notice of Allowance issued by the United States Patent and Trademark Office for U.S. Appl. No. 14/087,376, dated May 9, 2014.
Office Action issued by the United States Patent and Trademark Office for U.S. Appl. No. 14/143,580, dated May 9, 2014.
Notice of Allowance issued by the United States Patent and Trademark Office for U.S. Appl. No. 13/776,068, dated May 13, 2014.
Office Action issued by the United States Patent and Trademark Office for U.S. Appl. No. 14/013,190, dated May 20, 2014.

* cited by examiner

SYSTEM AND METHOD FOR UPLINK TRANSMISSIONS IN TIME DIVISION MIMO RDN ARCHITECTURE

FIELD OF THE INVENTION

The present invention relates generally to the field of radio frequency (RF) multiple-input-multiple-output (MIMO) systems and more particularly to TDD MIMO systems using RF beamforming and/or digital signal processing to enhance transmitter performance.

BACKGROUND OF THE INVENTION

In MIMO systems, multiple transmit antennae send signals to multiple receive antennae. In hybrid MIMO systems, each channel may be divided into multiple orthogonal channels or sub-channels separated spatially by pointing the beams in different directions so that multiple antennae may transmit data simultaneously over the same or overlapping channel frequency. Partitioning the channel spatially may increase the number of independent data streams that may be simultaneously or concurrently transmitted over each single channel, thereby increasing transmission efficiency. However, increasing the number of independent data streams over a channel may also increase "cross-talk"—noise caused by interference due to overlapping signal side-lobes or multi-path interference in which signals reflect off of nearby objects and generate noise at the receiver.

There is therefore a great need in the art for providing a system and method that decreases the noise and interference in hybrid MIMO systems.

SUMMARY OF EMBODIMENTS OF THE INVENTION

There is now provided according to embodiments of the invention an improved hybrid MIMO system for effectively overcoming the aforementioned difficulties inherent in the art.

According to an embodiment of the invention, a mobile device is provided in a MIMO system. The mobile device may include a plurality of N beamformers where N is an integer. Each nth beamformer (n=1, . . . , N) may be operatively connected to a plurality of kn antennae where kn is an integer, such that, the device comprises a total number of antennae that is greater than the number of beamformers N. The total number of antennae may be M, where $M=\Sigma_{n=1}^{n=N} kn$. The mobile device may include a processor to select an anchor (e.g., optimal) antenna set from among a plurality of antenna sets. Each antenna set may include a different one of the kn antennae for each nth beamformer. The mobile device may include a plurality of phase adjusters configured to set the phase(s) of the non-selected kn−1 antennae to align with the anchor antenna for each nth beamformer.

According to an embodiment of the invention, a mobile device is provided in a MIMO system. The mobile device may include a plurality of antennae communicating over a single channel with a base station using a time division protocol in which the antennae alternate between transmitting during uplink periods and receiving during downlink periods. The mobile device may include a processor configured to convert channel information measured by the plurality of antennae while receiving data at the mobile device during a downlink period to estimate channel information associated with uplink periods. The processor may be configured to select phases for the plurality of antennae to transmit data during the uplink periods. The mobile device may include a plurality of phase adjusters configured to set the phase(s) of data transmitted by the plurality of antennae during the uplink periods.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In accordance with the present invention and as used herein, the following terms are defined with the following meanings, unless explicitly stated otherwise.

The term "TDD" (Time Division Duplex) as used herein, is defined as the use of the same or a single channel (e.g., the same or overlapping frequency spectrum) for both downlink and uplink transmissions. For example, TDD communication, e.g., between a mobile device and a base station, may periodically alternate between uplink transmissions (e.g., from the mobile device to a base station for a predetermined uplink interval or period, such as, 5 milliseconds (ms)) and downlink transmissions (e.g., from a base station to a mobile device or UE for a predetermined downlink period, such as, 5 ms). The base station typically coordinates the alternating timing between uplink (UL) and downlink (DL) transmissions.

The term "MIMO" as used herein, is defined as the use of multiple antennae at both the transmitter and receiver. MIMO systems may improve communication performance by offering significant increases in data throughput and link range without additional bandwidth or increased transmit power. MIMO systems may achieve this goal by spreading the transmit power over multiple antennae to achieve spatial multiplexing that improves the spectral efficiency (more bits per second per frequency range or hertz (Hz) of bandwidth) or to achieve a diversity gain that improves the link reliability (e.g., reduced fading), or increased antenna directivity.

The term "beamforming" sometimes referred to as "spatial filtering," as used herein, is a signal processing technique used in antenna arrays for directional signal transmission or reception. This is achieved by combining elements in the array in such a way that signals at particular angles experience constructive interference while others experience destructive interference. Beamforming may be used at both the transmitting and receiving devices in order to achieve spatial selectivity.

The term "beamformer" as used herein refers to RF circuitry that implements beamforming. A transmitting beamformer (e.g., beamformer 30, 32 of FIG. 2) generally includes splitters (e.g., splitters 34, 36 of FIG. 2), phase adjusters (e.g., phase adjusters 38, 40 of FIG. 2) to adjust the phases of one or more of the (kn) signals, and in some cases amplifiers to amplify the signals and/or attenuators to attenuate the signals.

The term "Transmit Radio Distribution Network" or "Tx RDN" or simply "RDN" as used herein is defined as a group of two or more beamformers.

The term "hybrid MIMO RDN" as used herein is defined as a MIMO system that employs two or more antennae per channel (e.g., N is the number of channels and M is the total number of antennae and M>N). This architecture employs a beamformer for each channel so that two or more antennae may be combined for each radio circuit that is connected to each one of the channels. In hybrid MIMO RDN transmit systems, when the phases of the transmit signals from each antenna are properly set, adjusted or tuned with respect to one another, the individual signals may be combined and result in an improved performance of the transmit system.

Embodiments of the present invention may reduce the noise and interference inherent in hybrid MIMO systems by using beamforming techniques to de-correlate data streams transmitted over the same frequency channel by "pointing" or directing data streams to the receivers. Such embodiment may improve or optimize the overall signal-to-noise ratios for all data streams. Embodiments of the present invention may augment such systems with an RDN architecture to couple or connect multiple uplink transmit antennae to each beamformer to concentrate the transmission energy (e.g., narrow the transmission beam) and further reduce interference. Beamforming may be achieved by optimizing (e.g., setting or adjusting) the phases of signals transmitted from each antenna e.g., represented by a phase matrix Q.

The antenna phases that achieve optimal performance may be determined by evaluating the matrix product H·Q·W of a channel matrix H, the phase matrix Q and a pre-coding matrix W. Phase matrix Q may be set or adjusted so that cond (H·Q·W) is less than or equal to a maximum conditioning value Co (e.g., Co=2), where cond(H·Q·W) is the ratio of a largest to a smallest singular values $$\frac{\sigma_i}{\sigma_j},$$

where $\sigma_n$ is the nth singular value of the matrix H·Q·W. Minimizing cond(H·Q·W) so that the singular values are substantially similar (e.g. cond(H·Q·W)=1 when the singular values are exactly equal) may increase (e.g., providing a higher or relatively highest possible) MIMO gain and/or more uniformly distribute the relative gains (signal to noise ratio (SNR)) for all data streams.

An "anchor" set of antennae may be defined as a subset of RDN antennae (e.g., N antennae, one per beamformer) that is used as reference for tuning the RDN antennae. An anchor set of antennae that transmits signals at phases Q that are received with the highest relative power (e.g., the highest power relative to other anchor sets) while its corresponding cond(H·Q·W) is below a certain threshold (e.g., Co) may be selected from among the antennae coupled or connected to the beamformers. In one embodiment, antennae may be tested in sets of N antennae, with one antenna per beamformer. The optimal or anchor antenna set may be selected from among a plurality of different antenna sets, for example, that has a below threshold cond(H·Q·W) and an estimated maximum transmission power. The antenna set with the maximum power may be selected that has the highest sum of the squares (or a higher power) of the singular values, e.g., $$\sum \sigma_i^q, q \geq 2,$$

of the matrix H·Q·W.

In TDD communication, channel information during the uplink (transmit) periods may be determined experimentally by testing the channel information during one or more downlink (receive) periods or intervals in TDD communication. The mobile equipment may use a look through method (e.g., testing N antennae, one per beamformer/radio, at a time) to measure the downlink (receive) channel estimation matrix. The measured downlink channel matrix may be converted (e.g., transposed) to an uplink channel matrix (e.g., reversing the Tx and Rx antenna matrix indices). The look through method may not only provide the estimated uplink channel but also the downlink data rate information. The anchor antenna set may then be selected either by a computational method of calculating the highest uplink gain or by an experimental method of measuring the highest DL data rate.

According to the computational method, the anchor antenna set of highest gain may be determined as the antenna set associated with (1) a ratio of the largest to smallest singular values, $\sigma_i/\sigma_j$, of the matrix H·Q·W that is less than a predetermined constant Co and (2) a highest sum of squares (or a higher power) of its associated singular values, $$\sum \sigma_i^q, q \geq 2,$$

of the matrix H·Q·W (e.g., indicating maximal power).

According to the experimental method, the anchor antenna set may be determined as the antenna set associated with a highest downlink received data rates.

Once the anchor antenna in each beamformer is determined or selected, the phases of all other transmitting non-anchor antennae in the same beamformer may be set or adjusted, e.g., by a phase adjuster, so that their signals "align" with the phase of the anchor antenna. Signals of antennae may be aligned when they substantially constructively interfere (e.g., at their common point of maximum power) to be coherently combined at a base station. If the phases of the channels from an anchor antenna, a, to receive antennae 1 and 2 are, respectively, $\phi_{1a}$ and $\phi_{2a}$, and the phases of the channels from a non-anchor antenna, b, in the same beamformer, to receive antennae 1 and 2 are, respectively, $\phi_{1b}$ and $\phi_{2b}$, the phase adjustment $\Delta\phi$ to be applied to antenna b for aligning it with the anchor antenna a may be calculated as: $\Delta\phi = p \cdot (\phi_{1a} - \phi_{1b}) + (1-p) \cdot (\phi_{2a} - \phi_{2b})$, where p is a phase constant in a range between 0 and 1 (inclusive). In some embodiments, to eliminate phase wrap-around ambiguity (ambiguity in the respective signals a and b due to an overlapping or "wrap-around" effect when the relative angles between the signals exceed 180 degrees), the phase difference may be restricted as abs $((\phi_{1a} - \phi_{1b}) - (\phi_{2a} - \phi_{2b})) \leq 180°$. The optimal phase constant p may be determined by testing the relative received power for each of a plurality of values of p and selecting the value of the constant p associated with the maximal relative power (e.g., that maximizes $$\sum \sigma_i^q$$

) and substantially similar singular values (e.g., cond(H·Q·W) ≤2). Aligning the phases of the signals transmitted by the antennae may maximize the received signal power and substantially equalize the singular values as compared with other phases, thereby reducing interference in the hybrid MIMO system.

Figure 1:
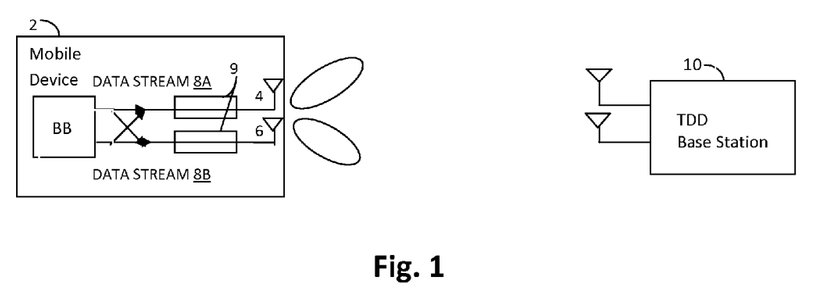
FIG. 1 is a schematic illustration of an uplink MIMO system according to embodiments of the invention.

Reference is made to FIG. 1, which schematically illustrates an uplink MIMO system according to embodiments of the invention. A 2×2 MIMO system is shown in the example of FIG. 1, although this discussion may be generalized to describe any N×N MIMO system. N indicates the number of independent transmitted data streams. In FIG. 1, a mobile device 2 includes a baseband (BB), N radios 9 coupled or connected to N (e.g., 2) transmit antennae 4, 6 transmitting data streams 8A, 8B, respectively, to a base station 10.

Figure 2:
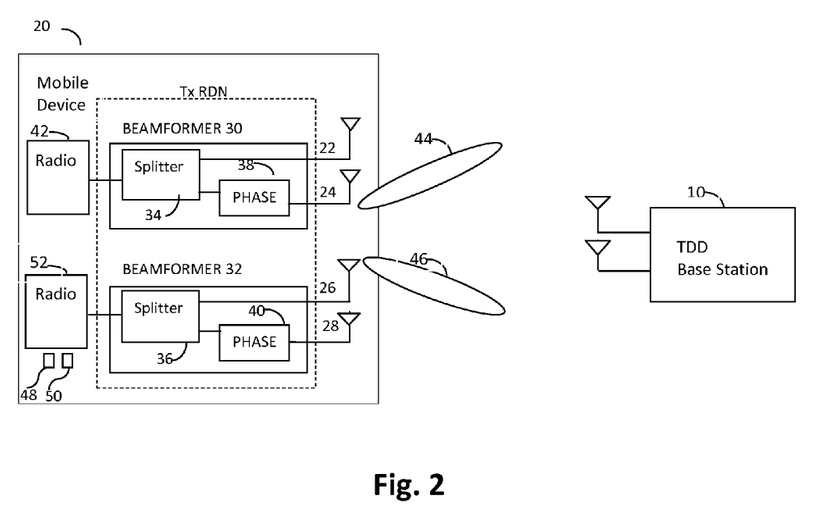
FIG. 2 is a schematic illustration of an uplink hybrid MIMO RDN system in accordance with an embodiment of the invention.

Reference is made to FIG. 2, which schematically illustrates an uplink hybrid MIMO RDN system in accordance with an embodiment of the invention. Each transmit antenna 4 and 6 in FIG. 1 is replaced in FIG. 2 by two or more antennae 22, 24 and 26, 28 respectively, thus providing transmission by four antennae. Although FIG. 2 shows a 2×2 hybrid MIMO RDN system augmented with two antennae per channel, any N×N MIMO RDN system may be used where one or more of N channels are augmented with two or more (kn) antennae (n=1, . . . , N). Each beamfomer is indexed by an integer number n=1, . . . , N and kn is an integer number of antennae in the nth beamformer. Accordingly, the total number of antennae in the system is an integer M, where $$M = \sum_{n=1}^{n=N} kn,$$

which is greater than the number of channels N.

In FIG. 2, a mobile device 20 may have M (e.g., 4) transmit antennae 22, 24, 26, 28 grouped into N sets of k antennae (M=k*N, where $k_1 = k_2 = k$). Each set of k (e.g., 2) antennae is coupled to a separate one of N (e.g., 2) beamformers 30, 32, splitters 34, 36 and/or phase adjusters 38, 40, respectively.

Mobile device 20 may include a radio circuit including N radios 42, 52 coupled to the N beamformers 30, 32 to input or send a signal into each splitter 34, 36, respectively. Each splitter 34, 36 outputs a set of kn (e.g., 2) signals. Phase adjusters or shifters 38, 40 may set or adjust the relative phases of all $$\sum_{n=1}^{n=N} kn$$

signals or a subset of $$\sum_{n=1}^{n=N} (kn - 1)$$

signals (leaving one anchor antenna per beamformer unchanged, thereby providing a reference phase, e.g., as shown in FIG. 2). Phase adjusters 38, 40 may adjust the phases of signals transmitted from antennae 22, 24, 26, 28, for example, using dedicated circuitry operated by software. All the antennae 22, 24, 26, and 28 in beamformers 30 and 32 may transmit data streams 44, 46 with a narrower beam (e.g., when compared to single antenna transmitting alone) to a base station 10. Transmitting data streams by a set of multiple M antennae (e.g., as in FIG. 2, where M=4) instead of by N antennae (e.g., as in FIG. 1, where N=2) in an N×N MIMO system may boost power, increase the precision of spatially directing a signal by beamforming, and concentrate the transmission energy (e.g., narrow the transmission beam) to reduce interference with other data streams at base station 10.

Mobile device 20 may include one or more processor(s) 48 to execute logic and/or instructions to implement operations according to embodiments of the present invention and one or more memor(ies) 50 to store the logic and/or instructions, as well as input to, output from and/or intermediary results generated according to embodiments of the present invention. Processor(s) 48 may be configured to perform methods according to embodiments of the present invention by, for example, being coupled to memory 50 storing software or instructions which when executed cause processor 48 to carry out embodiments of the present invention. In various embodiments, processor 48 may be a general purpose computer processor or central processing unit executing software, digital signal processors (DSPs) or dedicated chip, or other circuitry.

Mobile device 20 may be a user equipment (UE), such as, a cell phone, smart phone, tablet or any device with Wi-Fi capability and able to communicate with a Wi-Fi access point, or another wireless capable device or base station 10.

In hybrid MIMO RDN systems with rank N (e.g., the system shown in FIG. 2, where N=2), the N data streams originated at the transmitter may be represented by a transmitted data stream vector X and the N signals received by the receiver may be represented by a received signal vector Y. The dimension of the transmitted data stream vector X is N×1, the dimension of the received signal vector Y is N×1

The data streams are "pre-coded" by weights represented by the pre-coding weight matrix W which is an N×N matrix. The pre-coding weights W map the N data streams to the N transmitter radios. For example, pre-coding weights wij represents the weight applied to the jth data stream (from the baseband) for the ith transmitter radio, where all weights wij are represented for example in a weight matrix W of dimension (N×N). "Pre-coding" may de-correlate the data streams by forming N orthogonal beams: one for each jth data stream transmitted.

The N transmitter radios are connected to N beamformers, each having kn antennae, for a total of $$M = \sum_{n=1}^{n=N} kn$$

transmit antennae. Each beamformer may include kn phase adjusters or phase shifters to modulate the phases of M transmit antennae. A block diagonal phase matrix Q of dimension (M×N) may be defined, where the diagonal blocks have dimensions (kn×1) and each diagonal block, one per beamformer, comprises the phase shifts (expressed as complex exponentials) applied by the respective beamformer.

The relationship between the signals transmitted by the M transmit antennae and the signals received by the N receive antennae may be represented by a channel matrix H of dimension (N×M) defining all M·N paths between the M transmit antennae and N receive antennae. The channel matrix H includes entries $h_{ij}$ that represent the relationship between the signal transmitted from the jth transmit antenna to the signal received by the ith receive antenna. Modulating the phase of the transmitting signals may shift the spatial configuration of the signals emitted from each antenna to constructively interfere, for example, to maximize the signal power at a target receiver site, and destructively interfere, for example, to minimize the signal power at other receiver sites, e.g., thereby reducing noise and multipath fading effects. Channel matrix H may represent the channel information for the signals leading to constructive and destructive interference of the signals.

Since the initial transmit data streams X are modulated by the pre-coding matrix W, phase matrix Q, and channel matrix H, the receive data stream vector Y in the hybrid MIMO RDN system may be modeled as:

$$Y = H \cdot Q \cdot W \cdot X + n \quad (1)$$

where n is a signal noise vector of dimension (N×1).

The uplink channel matrix $H_{UL}$ is conventionally determined by channel estimation at the base station, while the downlink channel matrix $H_{DL}$ may be determined by channel estimation at the mobile device. However, in TDD communication, since each antenna alternates between uplink transmitting and downlink receiving over the same or single channel, according to embodiments of the invention, the mobile device may estimate uplink channel information by converting its down link channel information, for example, without any feedback of channel information from the base station. When antennae alternate between transmitting and receiving, their transmitting indice (i) and receiving indice (j) in the channel matrix H invert. A matrix in which indices (i) and (j) are inverted is referred to as the transpose matrix, denoted $H^T$. Thus, the channel matrix $H_{UL}$ for the uplink (UL) interval or period is the transpose of the channel matrix $H_{DL}^T$ for the downlink (DL) interval or period in TDD communications. Accordingly, instead of measuring the signal Y at the receive antennae, the transmitter may simply record its own received signals during downlink transmissions and compute the transpose (or a function thereof) of the associated channel matrix $H_{UL} = H_{DL}^T$. Thus, the transmitter may exploit its dual role as a transmitter/receiver in uplink/downlink TDD communication intervals or periods to measure its own channel matrix H without requesting information from other receivers.

Since the channel matrix H is measured and the pre-coding matrix W are typically set at the transmitter and hence known, embodiments of the invention may optimize the transmitted data streams by adjusting the phase matrix Q. The phase matrix Q may be optimized by satisfying two requirements. The first requirement in one embodiment is that the matrix product H·Q·W is well-conditioned. A well-conditioned matrix may have a ratio of the largest to smallest singular values, $$\frac{\sigma_i}{\sigma_j},$$

of the matrix H·Q·W that is minimized to be as close to 1 as possible (e.g., ideally 1 corresponding to equal singular values of the identity matrix). Permitted phases may be bound by a sufficiently low maximum conditioning value Co, such that cond $$(H \cdot Q \cdot W) = \frac{\sigma_i}{\sigma_j} < Co.$$

In one example, the maximum conditioning value Co is 2 or, in other examples, a number less than or equal to 10 or 100. The second requirement, in one embodiment, is to maximize the total received signal power at receivers by pointing the beams of the data streams in the same direction (e.g., by aligning the non-anchor antenna phases with the anchor antenna phases) of the each anchor antenna that transmits signals with the highest relative power from among the antennae coupled to the same beamformer. In one embodiment, the anchor antenna set may be determined by testing the antennae one-by-one using a "look through" method and selecting the antenna set with the highest sum of squares (or a higher power) of its associated singular values, $$\sum \sigma_i^q,$$

q≥2, of the corresponding matrix H·Q·W from among all antennae. Once the anchor antenna is selected for each beamformer, the other non-anchor antennae may be aligned with the anchor antenna coupled to the same beamformer. In one embodiment, sets of N antennae (one from each beamformer) may be tested together in the look through method.

Embodiments of the invention may maximize the total received power at the base station, while keeping H·Q·W well-conditioned. This optimization procedure may include a processor (e.g., processor 48 of mobile device 20 of FIG. 2) and comprises (1) selecting an anchor antenna set, for example, as described in reference to FIG. 3, and (2) tuning the beamformers (e.g., beamformers 30, 32 of FIG. 2) using phase adjusters (e.g., phase adjusters 38, 40 of FIG. 2) to align all non-anchor antennae with the anchor antenna coupled to the same beamformer, for example, as described in reference to FIG. 4.

Figure 3:
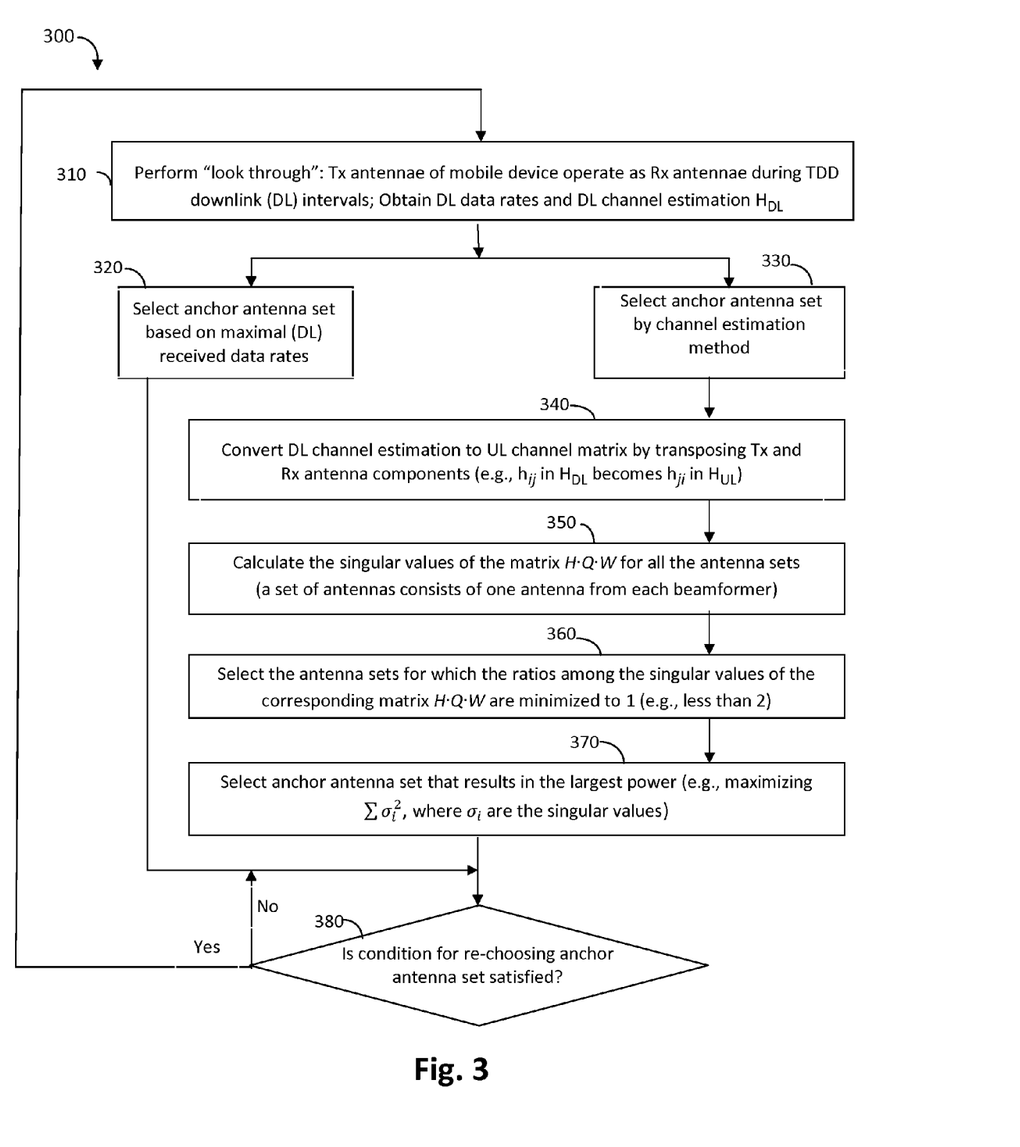
FIG. 3 is a flowchart of a method for selecting an anchor antenna set, which has the relatively highest gain compared to other antenna sets in the mobile device, in accordance with an embodiment of the invention.

Reference is made to FIG. 3, which is a flowchart of a method 300 for selecting an anchor antenna set, which has the relatively highest gain compared to other antenna sets in the mobile device, in accordance with an embodiment of the invention.

In a non-limiting example, method 300 of FIG. 3 may be executed using a full rank N×N MIMO device (e.g., mobile device 20 of FIG. 2) augmented with a Tx RDN of N beamformers, each nth beamformer coupled to a plurality (kn) of transmit antennae (n=1, . . . , N), for a total of M transmit antennae, where M>N. The base station (e.g., base station 10 of FIG. 2) may include N receivers.

A timer may be set, for example, based on mobility detection, for initiating and/or repeating the optimization process of workflow 300. In TDD communication, the mobile device and base station typically alternate between UL and DL period, e.g., 5 ms UL and 5 ms DL or 3 ms UL and 7 ms DL, as defined by the base station. In one embodiment, a single antenna set is tested per DL period (e.g., referred to as look through on a "per frame" basis), while in another embodiment, multiple antenna sets are tested per DL period (e.g., referred to as look through on a "per slot" basis). Before completing the look through operation 310 to select a new antenna set, for example, when not all antenna sets have been tested yet, the mobile device may continue to transmit with the most recently optimized phases selected in a previous iteration of workflows 300 and 400. In some embodiments, for a first iteration of workflows 300 and 400, when no phases have been optimized within a predetermined period of time (e.g., within 5 minutes or more), a single default antenna set may be used. In such embodiments, until the first iteration is completed for selecting the phases of all kn antennae augmenting each nth beamformer in the hybrid MIMO device, the system may not operate as an augmented system, but as a standard MIMO device transmitting with only one antenna per beamformer.

In a "look through" operation 310, each set of N Tx antennae (one from each beamformer) may be used as Rx antenna during one or more downlink DL time interval(s) of TDD communication. During the look through period only N antennae (one from each beamformer) may be active at any time (the remaining antennae may be turned off). The active antennae may receive data simultaneously at each of the N beamformers, one antenna per beamformer. In order to test all the various sets of N antennae, the receive antenna in each beamformer may be incremented (e.g., which antenna is used may be changed from one to the next in a sequence of antennae) to sequentially receive data at all kn antennae in each beamformer. In some embodiments, all beamformers increment the antennae when changing from one set of antennae to the next. Accordingly, if the number kn of antennae differs between beamformers, antennae from beamformers with a fewer number kn of antennae may be used more frequently than antennae from beamformers with a larger number of antennae. A processor (e.g., processor 48 of FIG. 2) may record the measured received values in memory (e.g., memory 50 of FIG. 2).

The processor may select the anchor antenna set for example based on:

Total received (DL) data rates for each antenna set (operation 320); and/or

Channel estimation information and the calculation of the optimal channel matrix (operations 330-370).

In operation 320, the processor may select the anchor antenna set that has the maximal or greatest total received data rate (e.g., when transmitting at the same power) measured in operation 310. In one embodiment, the processor may measure cumulative rates for each set of N antennae together, which may increase speed as compared to individually testing each combination of $$M = \sum_{n=1}^{n=N} kn$$

antennae alone. However, such embodiments may be limited to measuring only the preset combinations of the antennae as they are grouped into sets for simultaneous look through, thereby determining the best overall performing set of N antennae, but not necessarily the best combination of individual antennae. Although it may be done, it is generally impractical to test received data rates for all combinations of the M antennae in the mobile device. However, all combinations may be evaluated numerically by calculating the associated channel estimation information to select the optimal anchor antenna set from among all combinations of the M antennae according to operations 330-370.

In operation 330, the processor may initiate a process to select the anchor antenna set using a channel estimation method by executing operations 340-370.

In operation 340, the processor may convert downlink (DL) channel estimation information (e.g., $H_{DL}$) obtained in operation 310 to uplink (UL) channel estimation information (e.g., $H_{UL}$) by exchanging Tx antennae components (i) and Rx antennae components (j) (e.g., $h_{ij}$ in $H_{DL}$ becomes $h_{ji}$ in $H_{UL}$, i.e. $H_{UL}$ is the transpose of $H_{DL}$).

In operation 350, the processor may calculate the singular values of matrix $H_{UL} \cdot Q \cdot W$ for all antenna sets of the mobile device (each set including one antenna from each beamformer). Note, this computation may be executed for any antenna set, and is not limited to the antenna sets that are grouped for simultaneous look through in operations 310 and 320.

In operation 360, the processor may select or determine a plurality of antenna sets for which the ratios of the largest to smallest singular values, $$\frac{\sigma_i}{\sigma_j},$$

or the matrix $H_{UL} \cdot Q \cdot W$ is in a predefined range (e.g., less than or equal to 2). The total power required for a certain bit error rate for all data streams may be the least if the ratio of singular values is 1. Ratios of singular values below 2 may result in a significant decrease of the required total power for the same bit error rates performance. This operation may bound the allowable phases Q of the anchor antenna sets since channel matrix $H_{UL}$ and weight matrix W are typically fixed.

In operation 370, the processor may determine or select a single anchor antenna set from the plurality of antenna sets selected in operation 360 that achieves a maximal associated relative power (e.g., that maximizes the sum of a power of the singular value $$\sum \sigma_i^q, q \geq 2,$$

where $\tau_i$ are the singular values of the matrix $H \cdot Q \cdot W$). A greater power is typically associated with a greater transmission data rate.

In operation 380, to periodically or repeatedly re-choose the anchor antenna set, the processor may determine for example if a timer set has expired or a period of time has passed. If so, a process or processor may return to operation 310 to repeat or iterate the process of choosing the anchor antenna set. Alternatively, the process may repeat, not periodically, but based on a condition. For example, in operation 380, the processor may determine if a predefined condition is satisfied, such as, a change in mobile device location, establishing a new connection, detecting available processor resources, etc.

Method 300 may include other operations or orders of operations.

Figure 4:
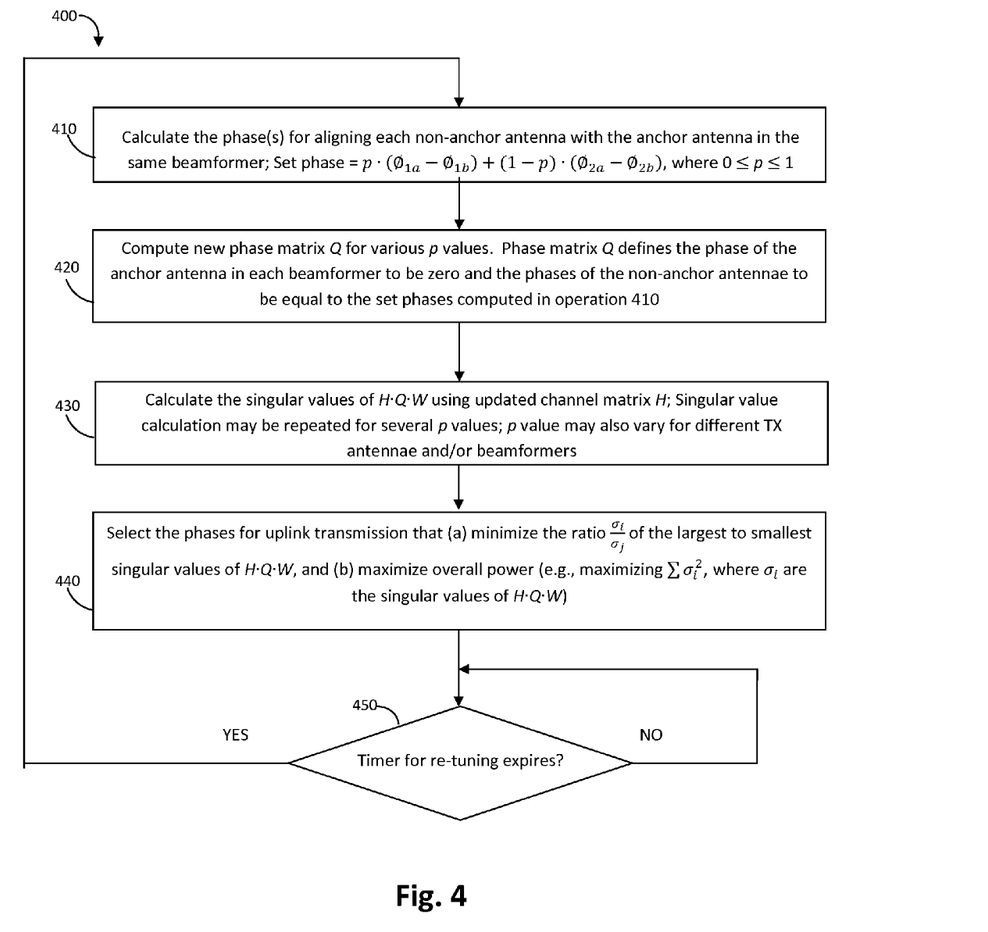
FIG. 4 is a flowchart of a method for selecting phase adjustments for aligning non-anchor antennae with the anchor antenna selected in FIG. 3 that are coupled or operatively connected to the same beamformer in accordance with an embodiment of the invention.

Once the anchor antenna set is chosen, e.g., as described in reference to FIG. 3, the phase adjusters (e.g., phase adjusters 38, 40 of FIG. 2) may align the other non-anchor antennae with the anchor antenna coupled to the same beamformer, e.g., as described in reference to FIG. 4. Antennae may be aligned when their transmitted signals combine coherently at a base station (e.g., base station 10 of FIG. 2). From the UL channel matrix, each Tx antenna has N channels to the N×N MIMO Rx antennae. In the example of a (2×2) MIMO system shown in FIG. 2, each Tx antenna has (2) channel components connected via wireless signals to (2) Rx antennae, and hence has (2) associated phases. In one embodiment described in reference to FIG. 4, only the phase(s) of the non-anchor antennae are set (relative to the anchor antenna) to form a beam. In another embodiment, the phase(s) of all anchor and non-anchor antennae may be set to form a beam. According to an embodiment of the invention, the phase adjusters may set the relative phases of the antennae to maximize the total power received from the mobile device (e.g., contributed by all antennae in the mobile device), while minimizing cond (H·Q·W).

Reference is made to FIG. 4, which is a flowchart of a method 400 for selecting phase adjustments for aligning the non-anchor antennae with the anchor antennae selected in FIG. 3 coupled to the same beamformer in accordance with an embodiment of the invention. Operations 410-440 may be iterated or repeated, e.g., sequentially or in parallel, for each beamformer.

In operation 410, a processor (e.g., processor 48 in mobile device 20 of FIG. 1) may calculate the phase adjustments for aligning each non-anchor antenna with the anchor antenna coupled to the same beamformer. The processor may determine N channel phases for each (jth) Tx antenna in a beamformer to transmit N data streams to the N Rx antennae. In the example shown in FIG. 2 of a (2×2) MIMO mobile device augmented by having (2) antennae coupled to each beamformer, the phase adjustments (set phases) for aligning each non-anchor antenna with the anchor in each beamformer may be, for example:

$$\text{set phases} = p \cdot (\phi_{1a} - \phi_{1b}) + (1-p) \cdot (\phi_{2a} - \phi_{2b}) \quad (2)$$

where $\phi_{ij}$ is the phase of the channel from the jth Tx antenna (j=a or b) to the ith Rx antenna (i=1 or 2), p is a constant in a range between 0 and 1 (inclusive), and the phase wraparound ambiguity is resolved by assuming $abs((\phi_{1a}-\phi_{1b})-(\phi_{2a}-\phi_{2b})) \leq 180°$. Phases $\phi_{ij}$ may be associated with the UL channel matrix $H_{UL}$, which is obtained by converting the DL channel matrix $H_{DL}$ (e.g., as described in reference to operation 340 of FIG. 3). Equation (2) may be evaluated for various values of p.

In operation 420, the processor may compute or calculate an updated N×M channel matrix $H_{UL}$ and a new M×N phase matrix Q defining the set phases of all (M) transmit antennae. Matrix Q may be calculated for various values of p. In one example, the phases of the anchor antennae for all beamformers may be set to zero and the phases of the non-anchor antennae are equal to the set phases computed according to equation (2).

In operation 430, the processor may calculate the singular values of matrix $H_{UL} \cdot Q \cdot W$ for various phase settings (e.g., various values of p where different values of p correspond to different phase matrices Q). Note that the values of p may vary for the different Tx antennae and/or different beamformers.

In operation 440, the processor may select the optimal phase Q, such that (a) the ratio of the largest to smallest singular values of the corresponding matrix $H_{UL} \cdot Q \cdot W$ is minimized or less than a threshold value such as 2, and (b) the overall power of all data streams is maximized (e.g., the sum of the squares, $$\sum \sigma_i^2,$$

or a higher power, of the singular values $\sigma_i$ of the matrix of $H_{UL} \cdot Q \cdot W$ is maximized).

In operation 450, the processor may set a timer, for example, to initiate re-tuning the beamformers to optimize signal alignment, independently from selecting the new anchor antenna set. For example, the beamformer may be re-tuned periodically, when a change in the location of the mobile device is detected, upon establishing a new connection or when mobile device resources become available. If channel information is used for tuning the beamformers, method 400 may be executed whenever updated channel information becomes available.

Method 400 may include other operations or orders of operations. For example, if the phases are set for all antennae (not just the non-anchor antennae), an additional operation for setting the phases of the anchor antenna may be executed prior to operation 410.

Embodiments of the invention may include a systems and method for phase optimization for a plurality of kn antennae in each nth one of a plurality of N transmit beamformers to maximize a total data throughput in a TDD N×N MIMO system with a mobile device augmented by a transmit RDN. The transmit system may have a baseband module and N radio channels to transmit N data streams. The N data streams may be mapped to N transmit antenna ports according to N×N pre-coding weights, wherein each antenna port connects to a beamformer of the Tx radio distribution network. In TDD communication (e.g., UL and DL using the same or overlapping frequency spectrum), the downlink channel estimation may be converted (transposed) to uplink channel information, which together with the known pre-coding weights, may be used to select the Tx beamformer antenna phases Q for optimizing the TDD uplink MIMO system performance. The optimized performance metrics for a UL MIMO system may maximize the total received power and maintain a close to 1 ratio of the largest to smallest singular values of the matrix H·Q·W.

Embodiments of the invention may include a system comprising a transmit RDN that consists of N beamformers for an N×N MIMO system, wherein the beamformers are connected to N antenna ports for the input of up to N mixed data streams. Each nth one of the N beamformers has a plurality of kn antennae, the antennae are input from a signal splitter and the phases of the input signals from the splitter are independently adjustable by phase adjusters.

Embodiments of the invention provide a method and system for optimizing a Tx RDN (beamformer antenna phase settings) for a TDD UL MIMO system to maximize the total data throughput. The optimization may be carried out by maximizing the total received power ($\Sigma \sigma_i^2$), while keeping low the ratio of the largest to smallest singular values, $$\frac{\sigma_i}{\sigma_j},$$

of the matrix H·Q·W (i.e., below a predetermined threshold).

It may be understood by a person of ordinary skill in the art that the description herein of optimizing the matrix product H·Q·W may be replaced with optimizing the matrix product H·Q, e.g., when no weights are used (e.g., matrix W is an identity matrix) or to not consider the pre-coding weights (e.g. matrix W is unitary).

Embodiments of the invention may be software-implemented using dedicated instruction(s) or, alternatively, hardware-implemented using designated circuitry and/or logic arrays.

Embodiments of the invention may include an article such as a computer or processor readable non-transitory storage medium, such as for example a memory (e.g., memor(ies) 50 of FIG. 1), a disk drive, or a USB flash memory encoding, including or storing instructions, e.g., computer-executable instructions, which when executed by a processor or controller (e.g., processor(s) 48 of FIG. 1), cause the processor or controller to carry out methods disclosed herein.

Different embodiments are disclosed herein. Features of certain embodiments may be combined with features of other embodiments; thus certain embodiments may be combinations of features of multiple embodiments.

Although the particular embodiments shown and described above will prove to be useful for the many distribution systems to which the present invention pertains, further modifications of the present invention will occur to persons skilled in the art. All such modifications are deemed to be within the scope and spirit of the present invention as defined by the appended claims.

The invention claimed is:

1. A mobile device in a multiple-input multiple-output (MIMO) system, the mobile device comprising:
a plurality of N beamformers where N is an integer of which each nth beamformer (n=1, . . . , N) is operatively connected to a plurality of kn antennae where kn is an integer such that the device comprises a total number of antennae that is greater than the number of beamformers N,
a processor to select an optimal antenna set from among a plurality of antenna sets, each antenna set comprising a different one of the kn antennae for each nth beamformer; and
a plurality of phase adjusters configured to set the phase(s) of the non-selected kn−1 antennae to align with the phase of the selected antenna for each nth beamformer.

2. The mobile device of claim 1 comprising a total number of antennae M, wherein $$M = \sum_{n=1}^{n=N} kn.$$

3. The mobile device of claim 1, wherein each antenna in the mobile device alternates between transmitting during uplink periods and receiving during downlink periods on a single channel according to a time division communication protocol and wherein the selected antenna set defining the phases for transmitting during the uplink periods is selected using information measured at the mobile device while receiving during one or more downlink periods.

4. The mobile device of claim 3, wherein the processor selects the selected antenna set measured to have a maximal total data rate received by the sets during the downlink periods.

5. The mobile device of claim 3, wherein the processor selects the selected antenna set calculated to have an estimated below threshold variation of signal-to-noise ratio and an estimated maximum power for transmitting during uplink periods.

6. The mobile device of claim 5, wherein the processor selects the selected antenna set calculated to have a minimum ratio of largest to smallest singular values $$\frac{\sigma_i}{\sigma_j}$$

of a matrix $H_{UL}$·Q·W, and a maximum sum of powers of singular values $$\sum \sigma_i^q, q \geq 2,$$

of the matrix $H_{UL}$·Q·W, where $H_{UL}$ is an uplink channel matrix, Q is a phase matrix and W is a pre-coding matrix.

7. The mobile device of claim 6, wherein the uplink channel matrix $H_{UL}$ is calculated as a function of the transpose of a downlink channel matrix $H_{DL}{}^T$ measured during the downlink period.

8. The mobile device of claim 1, wherein the phase adjusters adjust the phases of a non-selected antenna, b, for aligning it with the selected antenna, a, in each beamformer by p·($\phi_{1a}$−$\phi_{1b}$)+(1−p)·($\phi_{2a}$−$\phi_{2b}$), wherein $\phi_{ij}$ is the phase of the channel from the jth transmitting antenna to the ith receiving antenna, p is a phase constant in a range between 0 and 1, and abs(($\phi_{1a}$−$\phi_{1b}$)−($\phi_{2a}$−$\phi_{2b}$))≤180.

9. The mobile device of claim 8, wherein the value of the phase constant p is measured to maximize the received power.

10. The mobile device of claim 8, wherein the value of the phase constant p is computed to maximize a sum of powers of singular values $$\sum \sigma_i^q, q \geq 2,$$

of a matrix $H_{UL}$·Q·W, where $H_{UL}$ is an uplink channel matrix, Q is a phase matrix and W is a pre-coding matrix.

11. The mobile device of claim 1, wherein the mobile device is a full rank N×N MIMO transmitter augmented by a plurality of kn antennae coupled to at least one (nth) of the N beamformers.

12. A mobile device in a multiple-input multiple-output (MIMO) system, the mobile device comprising:
a plurality of antennae communicating over a single channel with a base station using a time division protocol in which the antennae alternate between transmitting during uplink periods and receiving during downlink periods;
a processor configured to convert channel information measured by the plurality of antennae while receiving data at the mobile device during a downlink period to estimate channel information associated with uplink periods and configured to select phases for the plurality of antennae to transmit data during the uplink periods; and
a plurality of phase adjusters configured to set the phase(s) of data transmitted by the plurality of antennae during the uplink periods, wherein the processor selects phases for the antennae to transmit during the uplink periods based on calculations that correspond to an estimated below threshold signal-to-noise ratio variation and an estimated maximum power.

13. The mobile device of claim 12, wherein the processor selects phases for the antennae to transmit during the uplink periods selected that are calculated to have a minimum ratio of largest to smallest singular values, $$\frac{\sigma_i}{\sigma_j},$$

of a matrix $H_{UL} \cdot Q \cdot W$, and a maximum sum of powers of singular values $$\sum \sigma_i^q, q \geq 2,$$

of the matrix $H_{UL} \cdot Q \cdot W$, where $H_{UL}$ is an uplink channel matrix, Q is a phase matrix and W is a pre-coding matrix.

14. The mobile device of claim 12, wherein the uplink channel matrix $H_{UL}$ is calculated as a function of the transpose of a downlink channel matrix $H_{DL}^T$ measured during the downlink period.

15. The mobile device of claim 12 comprising N beamformers, wherein the plurality of antennae are grouped into kn antennae coupled to each nth beamformer to transmit N data streams, wherein n=1, . . . , N.

16. The mobile device of claim 15, wherein the receiving base station includes N receivers for a full rank N×N MIMO system augmented by a plurality of kn antennae coupled to at least one (nth) of the N beamformers.

17. The mobile device of claim 15, wherein before receiving data during downlink periods for all of the plurality of antennae, the phase adjusters use previously set phase(s) for the plurality of antennae.

18. A method for transmitting data in a multiple-input multiple-output (MIMO) system, the method comprising:
transmitting data from a plurality of M antennae, wherein the plurality of M antennae include an integer number of kn antennae operatively connected to each nth one of a plurality of N beamformers (n=1, . . . , N) such that $$M = \sum_{n=1}^{n=N}$$

kn and M>N;
selecting an optimal antenna set from among a plurality of antenna sets, each antenna set comprising a different one of the kn antennae for each nth beamformer; and
setting the phase(s) of the non-selected kn−1 antennae to align with the phase of the selected antenna for each nth beamformer.

19. The method of claim 18, comprising alternating the direction of transmission of each antenna in the mobile device between transmitting during uplink periods and receiving during downlink periods on a single channel according to a time division communication protocol and selecting the selected antenna set defining the phases for transmitting during the uplink periods using information measured by at least some of the plurality of M antennae while receiving during one or more downlink periods.

20. The method of claim 19, wherein the selected antenna set is selected that is measured to have a maximal total data rate received by the sets during the downlink periods.

21. The method of claim 19, wherein the selected antenna set is selected that is calculated to have an estimated below threshold signal-to-noise ratio variation and an estimated maximum power for transmitting during uplink periods.

22. The method of claim 21, wherein the selected antenna set is selected that is calculated to have a minimum ratio of largest to smallest singular values $$\frac{\sigma_i}{\sigma_j}$$

of a matrix $H_{UL} \cdot Q \cdot W$, and a maximum sum of powers of singular values $$\sum \sigma_i^q, q \geq 2,$$

of the matrix $H_{UL} \cdot Q \cdot W$, where $H_{UL}$ is an uplink channel matrix, Q is a phase matrix and W is a pre-coding matrix.

23. The method of claim 22, wherein the uplink channel matrix H is calculated as a function of the transpose of a downlink channel matrix $H_{DL}^T$ measured during the downlink period.

24. The method of claim 18, wherein the phases applied to a non-anchor antenna, b, for aligning it with the anchor antenna, a, in each beamformer is adjusted by $p \cdot (\phi_{1a} - \phi_{1b}) + (1-p) \cdot (\phi_{2a} - \phi_{2b})$, wherein $\phi_{ij}$ is the phase of the channel from the jth transmitting antenna to the ith receiving antenna, p is a phase constant in a range between 0 and 1, and $abs((\phi_{1a} - \phi_{1b}) - (\phi_{2a} - \phi_{2b})) - 180°$.

25. The method of claim 24, wherein the value of the phase constant p is measured to maximize the received power.

26. The method of claim 24, wherein the value of the phase constant p is computed to maximize a sum of powers of singular values $$\sum \sigma_i^q, q \geq 2,$$

of a matrix $H_{UL} \cdot Q \cdot W$, where $H_{UL}$ is an uplink channel matrix, Q is a phase matrix and W is a pre-coding matrix.

27. The method of claim 18, wherein the data is transmitted by the plurality of M antennae in a full rank N×N MIMO transmitter augmented by a plurality of kn antennae coupled to at least one (nth) of the N beamformers.

* * * * *